(12) United States Patent
Chuang

(10) Patent No.: US 10,740,661 B2
(45) Date of Patent: Aug. 11, 2020

(54) CARD CONNECTOR HAVING A SHAPE MEMORY ALLOY WIRE COUPLED TO A SLIDER FOR OPERATING A CARD-LOCKING LATCH

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Shun-Jung Chuang, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 16/257,081

(22) Filed: Jan. 25, 2019

(65) Prior Publication Data
US 2019/0244065 A1 Aug. 8, 2019

(30) Foreign Application Priority Data
Feb. 6, 2018 (CN) .......................... 2018 1 0117031

(51) Int. Cl.
| | | |
|---|---|---|
| *G06K 13/08* | (2006.01) | |
| *G06K 7/00* | (2006.01) | |
| *H01R 13/635* | (2006.01) | |
| *H01R 13/627* | (2006.01) | |

(52) U.S. Cl.
CPC ....... *G06K 13/0856* (2013.01); *G06K 7/0021* (2013.01); *G06K 7/0056* (2013.01); *G06K 13/0831* (2013.01); *H01R 13/6271* (2013.01); *H01R 13/635* (2013.01)

(58) Field of Classification Search
CPC .... H01R 13/6271–6273; H01R 13/635; G06K 13/08; G06K 13/0831; G06K 13/0856; G06K 7/0021; G06K 7/0056
See application file for complete search history.

(56) References Cited

U.S. PATENT DOCUMENTS

| | | |
|---|---|---|
| 5,831,820 A | 11/1998 | Huang |
| 7,865,210 B2 | 1/2011 | Wang et al. |
| 8,147,262 B1 * | 4/2012 | Su ...................... G06K 13/0831 439/159 |
| 9,001,501 B2 | 4/2015 | Takasaki et al. |

(Continued)

FOREIGN PATENT DOCUMENTS

| | | |
|---|---|---|
| CN | 205159663 | 4/2016 |
| KR | 101460079 | 11/2014 |
| WO | 2012150756 | 11/2012 |

*Primary Examiner* — Oscar C Jimenez
(74) *Attorney, Agent, or Firm* — Wei Te Chung; Ming Chieh Chang

(57) ABSTRACT

A card connector includes: an insulative body; plural contacts secured to the insulative body; and an operating mechanism including a latch moveable relative to the insulative body and an actuator coupled to the latch, wherein: the actuator includes a pair of terminals, a slider coupled to one of the pair of terminals, and a shape memory alloy wire coupled between the other terminal and the slider; and the slider is operable by the shape memory alloy wire to move the latch from a card-locking position to a card-unlocking position.

20 Claims, 17 Drawing Sheets

(56) References Cited

U.S. PATENT DOCUMENTS

| | | | |
|---|---|---|---|
| 9,378,436 B2* | 6/2016 | Wang | G06K 13/08 |
| 9,396,416 B2* | 7/2016 | Matsumoto | G06K 13/0812 |
| 9,544,000 B2 | 1/2017 | Hirata et al. | |
| 9,576,225 B2 | 2/2017 | Zhang | |
| 2002/0101722 A1* | 8/2002 | Oguchi | G06K 7/0021 |
| | | | 361/728 |
| 2010/0055985 A1* | 3/2010 | Hu | G06K 7/0021 |
| | | | 439/626 |
| 2013/0063910 A1* | 3/2013 | Chao | G06F 1/1656 |
| | | | 361/754 |
| 2013/0196523 A1 | 8/2013 | Lim et al. | |
| 2015/0188257 A1* | 7/2015 | Lin | G06K 13/0812 |
| | | | 439/159 |
| 2016/0240981 A1* | 8/2016 | Zhang | H01R 43/20 |
| 2018/0109032 A1 | 4/2018 | Chen | |
| 2019/0272453 A1* | 9/2019 | Argyres | H01R 27/00 |

* cited by examiner

CARD CONNECTOR HAVING A SHAPE MEMORY ALLOY WIRE COUPLED TO A SLIDER FOR OPERATING A CARD-LOCKING LATCH

BACKGROUND OF THE INVENTION

1. Field of the Invention

The present invention relates to a card connector for a card tray, including a slider operable by a shape memory alloy wire to move a latch from a card-locking position to a card-unlocking position.

2. Description of Related Arts

U.S. Pat. No. 7,865,210 discloses an ejectable component assembly for passing a removable card tray through an opening in a housing of an electronic device and aligning the card tray with a circuit board within the electronic device housing. The assembly comprises: a connector for retaining the card tray when the card tray is inserted in a first direction through the opening; and an ejector coupled to the electronic device housing for ejecting the card tray from the connector in a second direction opposite to the first direction. The ejector comprises: a base that pivots about a portion of the housing; an extension arm coupled to the base; a user contact plate coupled to a first portion of the extension arm; and a card tray contact plate coupled to a second portion of the extension arm.

U.S. Pat. No. 9,001,501 discloses a card tray and a card connector for receiving the card tray. The card connector includes a housing, a shell covering the housing, and a tray guiding mechanism having a sliding member. A cam groove serving as a heart-shaped cam is formed on the upper face of the sliding member, and the free end of a slender pin member serving as a fixed cam member engages the cam groove. The other end of the pin member is fixed pivotally to the rear end portion of the housing as the fixed end. The pin member and the cam groove work together to perform a push/push operation on the sliding member moving along with the card tray. A biasing member or coil spring is accommodated inside the tray guiding mechanism to provide biasing force in a compressed state which biases the sliding member towards the rear end portion, i.e., in the ejection direction of the card tray.

U.S. Pat. No. 5,831,820 discloses a peripheral docking module using a shape memory alloy actuator wire which when deformed returns to its pre-deformed shape when heated. Specifically, upon application of energy from an energy source to the shape memory alloy actuator wire, the shape memory alloy actuator wire contracts and exerts a pulling force to eject a docketed device.

SUMMARY OF THE INVENTION

A card connector comprises: an insulative body; a plurality of contacts secured to the insulative body; and an operating mechanism including a latch moveable relative to the insulative body and an actuator coupled to the latch; wherein the actuator includes a pair of terminals, a slider coupled to one of the pair of terminals, and a shape memory alloy wire coupled between the other terminal and the slider; and the slider is operable by the shape memory alloy wire to move the latch from a card-locking position to a card-unlocking position.

DETAILED DESCRIPTION OF THE PREFERRED EMBODIMENT

Figure 1:
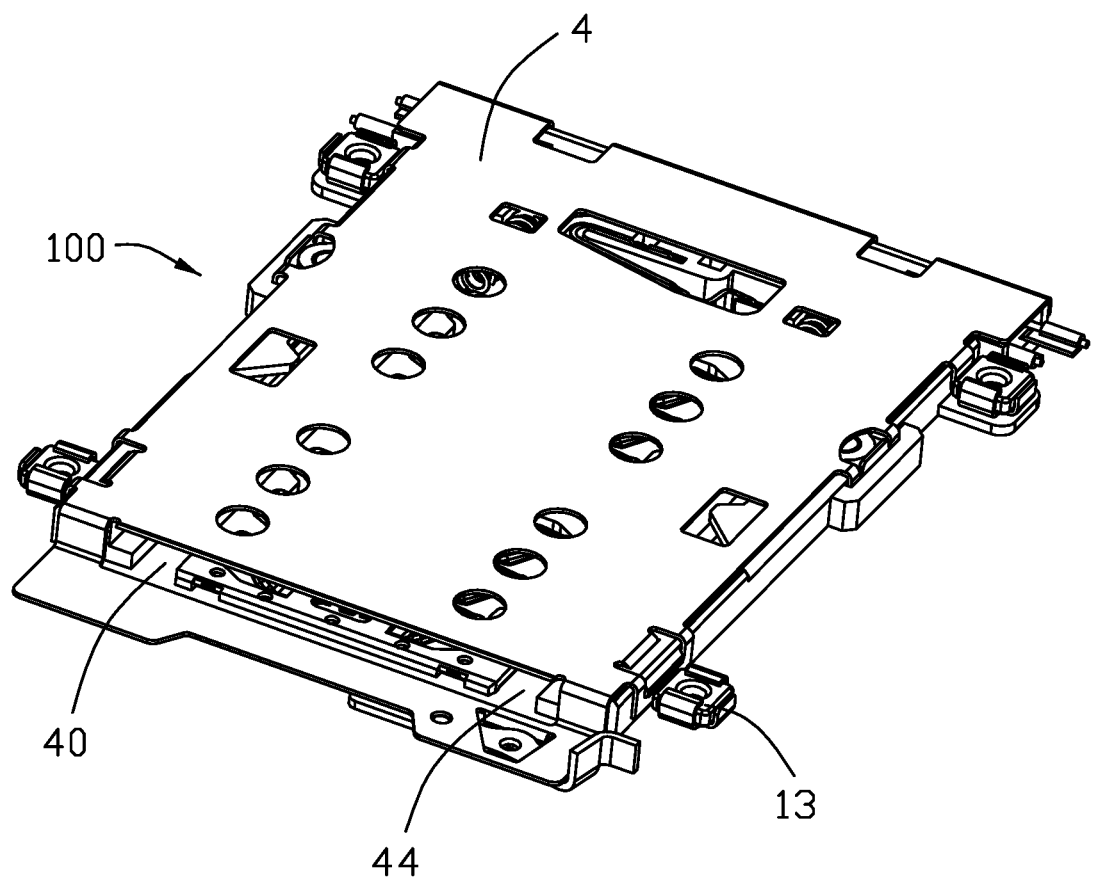
FIG. 1 is a perspective view of a card connector in accordance with a first embodiment of the present invention.

Referring to FIGS. 1 to 7, a card connector assembly comprises an electrical connector 100 of a first embodiment, preferably to be board-mounted behind an opening in a housing of an electronic device, and a card tray 200 insertable into and received by the electrical connector 100 through the housing opening of the electronic device. The electrical connector 100 includes an insulative body 1, a plurality of contacts 2 secured to the insulative body, and an operating mechanism 3. The electrical connector may further comprise a shielding cover 4 mounted to the insulative body to form a receiving space 40.

Referring to FIGS. 2-7, the insulative body 1 includes a base 11, a pair of side beams 12, and a separate part insert molded with the contacts 2. The base 11 has a receiving groove 111 extending in a lateral direction and a pair of retaining grooves 112 extending in a front-to-back direction. Each side beam 12 has a recess 121, a post 1211 in the recess, a protrusion 122, and a slot 1221 in the protrusion.

Figure 5:
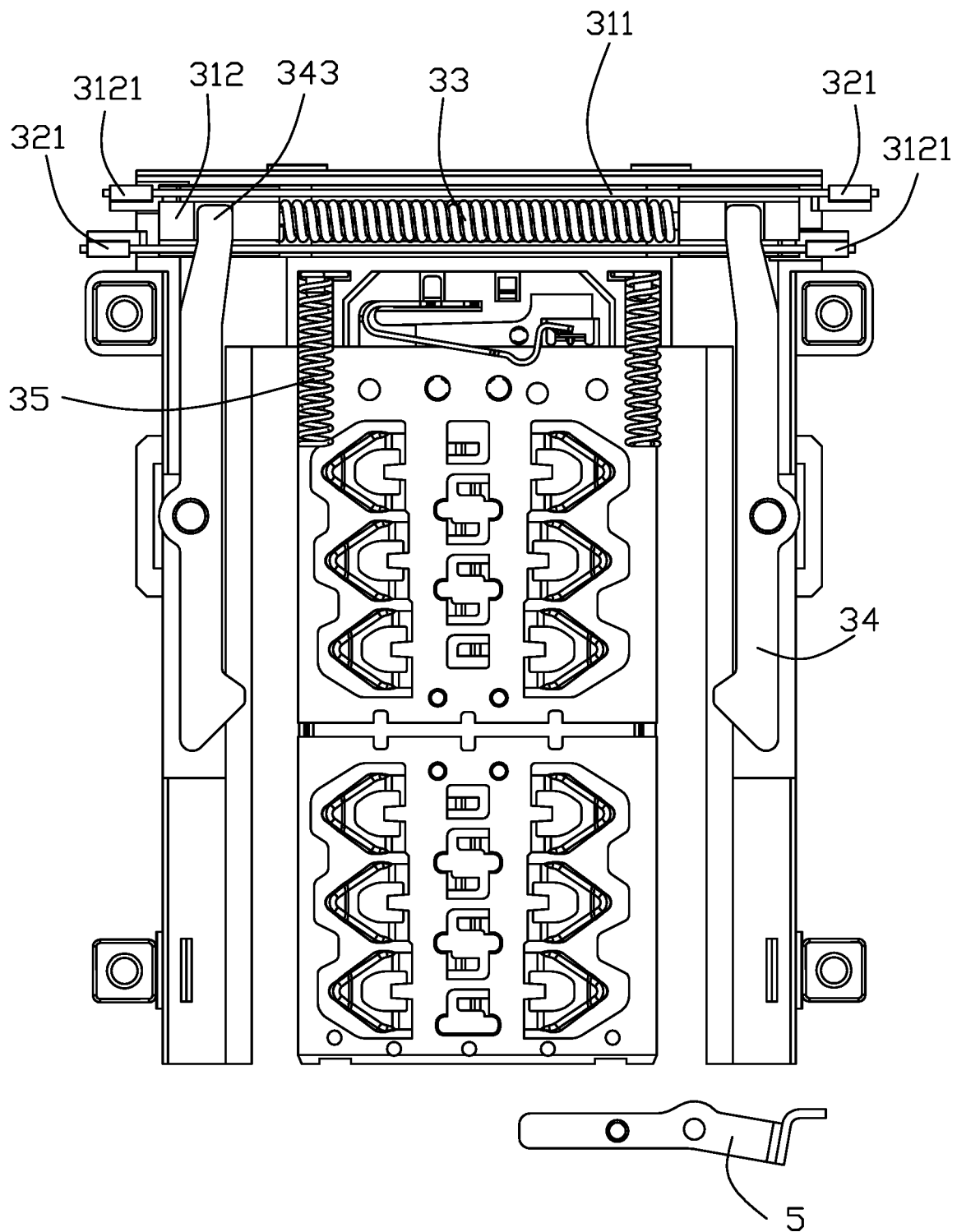
FIG. 5 is a top plan view of the card connector omitting a cover thereof.

Referring to FIG. 5, the contacts 2 are arranged in two rows. Each contact 2 includes a contacting portion 21, a soldering portion 22, and an intermediate portion.

Referring to FIGS. 2-7, the operating mechanism 3 includes a latch 34 moveable relative to the insulative body 1 and an actuator 31 coupled to the latch 34. The actuator 31 includes a pair of terminals 32, a slider 312 coupled to one of the pair of terminals, and a shape memory alloy wire 311 coupled between the other terminal and the slider 312. In the embodiment shown, two sliders 32 and two wires 311 are provided to couple to two latches 34. The pair of terminals 32 are insert molded in the base 11 and each terminal has a spring finger in constant contact with a metallic piece of the slider 312. The operating mechanism 3 may include a spring 33 coupled between the two sliders 32. The operating mechanism 3 may further include a pair of springs 35 each having an end secured in the retaining groove 112 of the insulative body 1 and an opposite free end adapted for biasing the card tray 200. The slider 312 has an insulative part having a notch 3123 and a post 3122 and a metallic piece secured to the insulative part and having a socket 3121. The notch 3123 receives an end 343 of the latch 34. The socket 3121 fixedly receives an end of the shape memory alloy wire 311. Each terminal 32 has a socket 321 fixedly receiving another end of the shape memory alloy wire 311. As is known in this art, therefore, the shape memory alloy wire 311 is so designed and arranged that when heated due to current flowing therethrough via the two terminals and the metallic piece of the slider 312 it exerts a pulling force on the slider 312 to move the latch 34. The latch 34 has a hole 341 receiving the post 1211 and a hook 342 for engaging a notch 2021 of the card tray 200.

Referring to FIGS. 2-7, the cover 4 includes a main part 41, a front vertical portion 42, and a front horizontal portion 43. The main part 41 has on each of two opposite sides thereof a bent wing 411 received in the slot 1221, two nut-receiving portions 413 for nuts 13, and a window 414. The vertical portion 42 has an opening 44 for inserting the card tray 200 into the receiving space 40. The horizontal portion 43 has a flap 431, a post 432 on the flap, and a hole 433.

Figure 2:
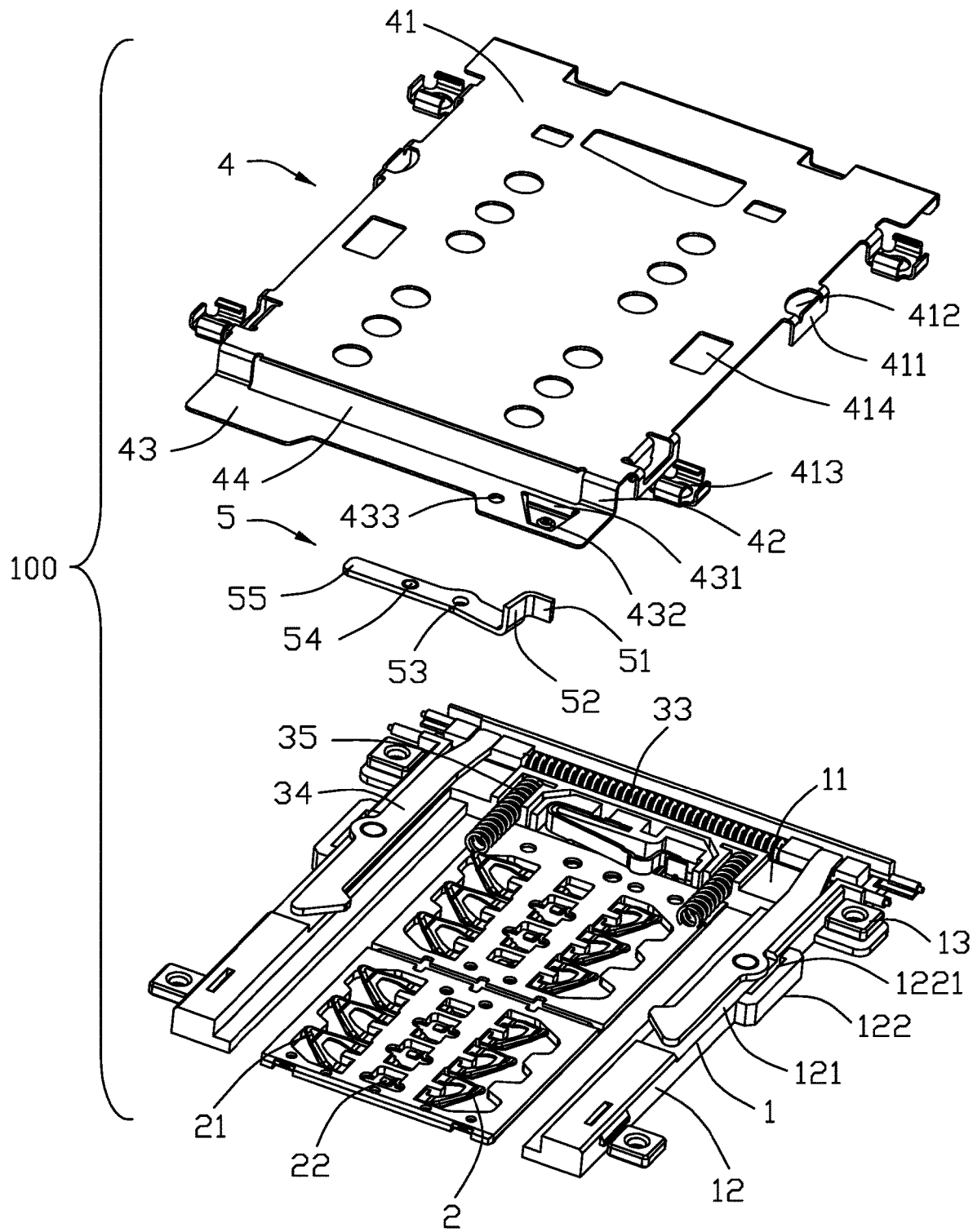
FIG. 2 is a partial exploded view of the card connector.
Figure 3:
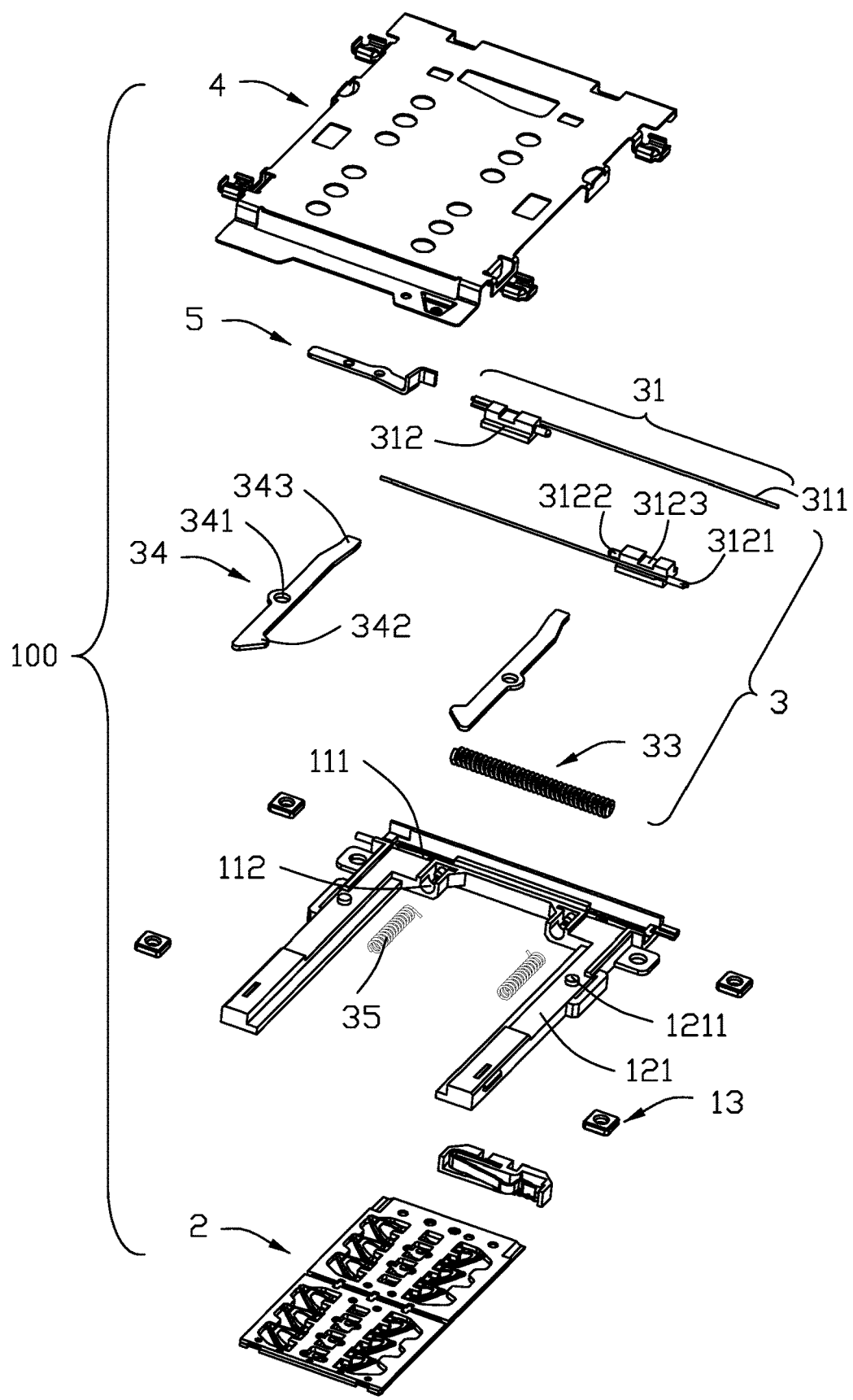
FIG. 3 is a further exploded view of the card connector.
Figure 4:
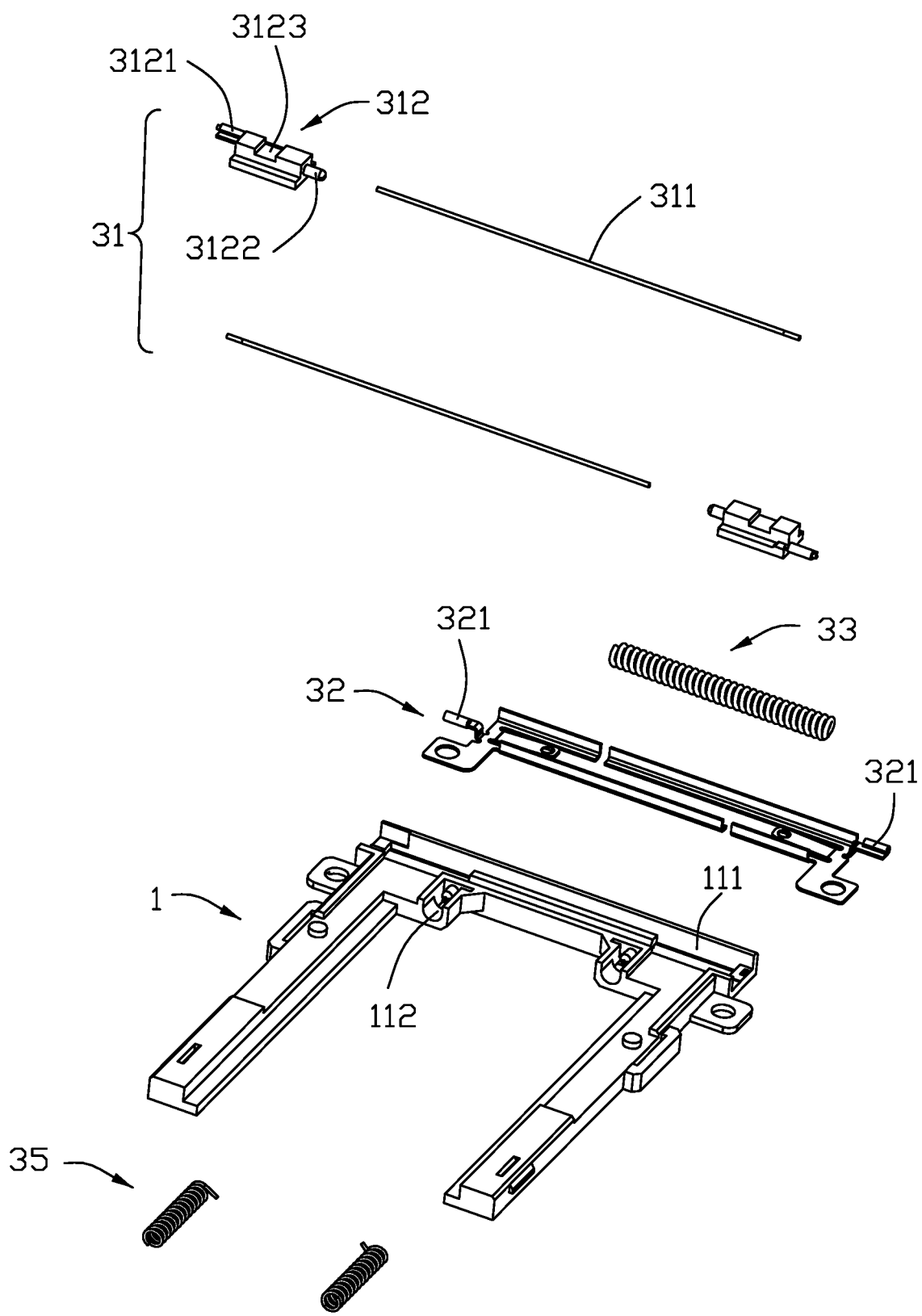
FIG. 4 is a further exploded view of some components of the card connector in FIG. 3.
Figure 6:
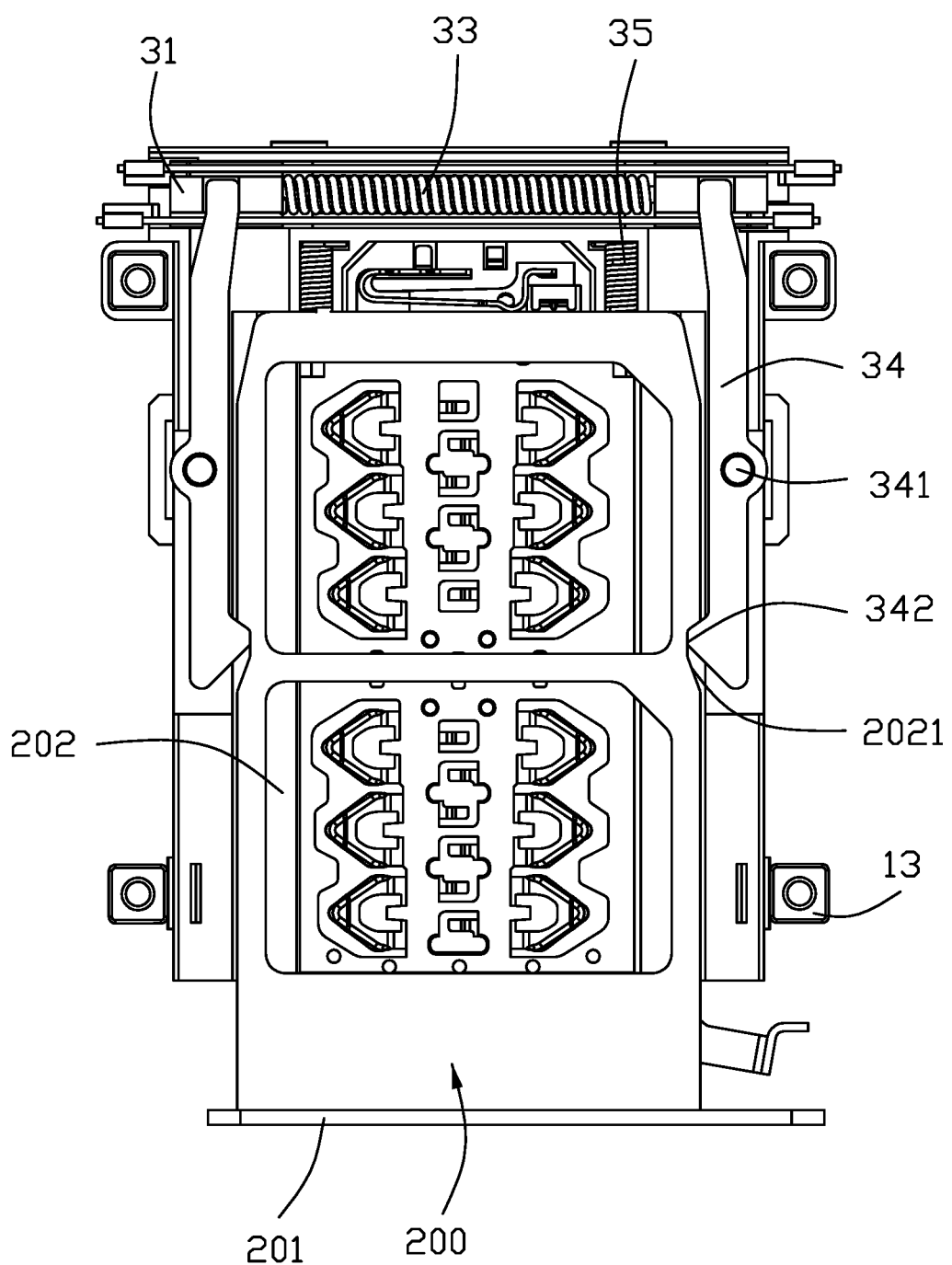
FIG. 6 is a view similar to FIG. 5 further showing a card tray being inserted in position.
Figure 7:
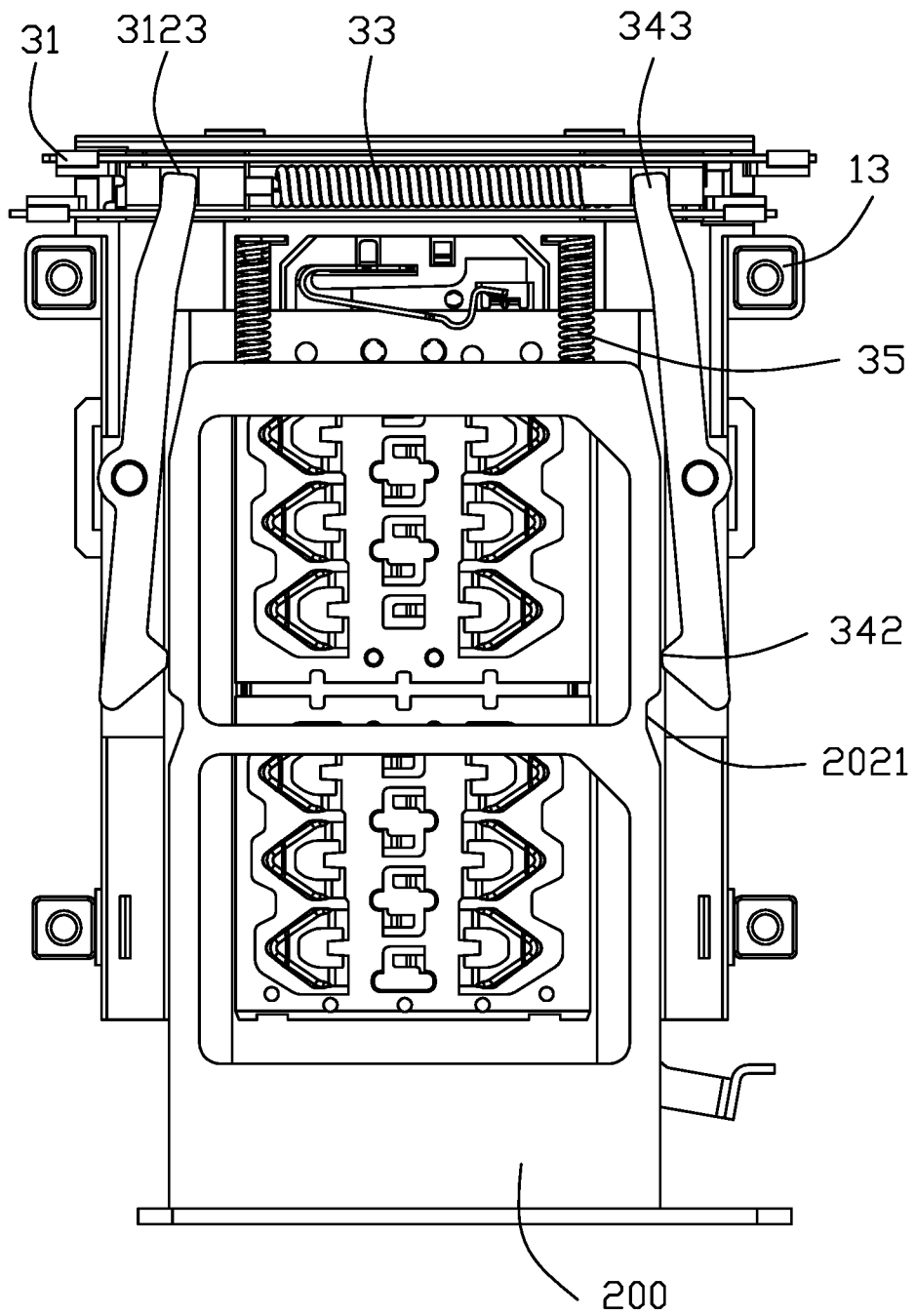
FIG. 7 is a view similar to FIG. 6 but showing the card tray being ejected.

Referring to FIG. 6, the card tray 200 may include a panel 201 and a main part 202 for receiving electronic cards. The panel 201 has a hole 2011 for inserting a pin tool 300. The main part 202 has a pair of side recesses 2021 each for receiving the hook 342 of the latch 34. As shown in FIG. 2, an ejector 5 is provided for pivotally mounting to the horizontal portion 43 of the cover 4. The ejector 5 is to contact a rear surface of the card tray panel 201 or a suitable part of the card tray and, by way of a pivoting movement, to manually push the card tray out of its locking position from the latch 34. The ejector 5 has a pressing portion 51, a hole 53 receiving the post 432, a hump 54 to be received in the hole 433, and a bearing portion 55 for moving the card tray 200.

In use, the card tear 200 is inserted, against the spring force from the springs 35, and then locked by the latches 34. At this moment, the latch 34 is at a card-locking position. To unlock the card tray, the pair of terminals 32 connected to energy source through a printed circuit board to which the electrical connector 100 is mounted is energized and causes the shape memory alloy wires 311 to drive respective sliders 312 which in turn moves the latches 34 to a card-unlocking position. At this position, the card tray 200 will be ejected out under the spring force of the springs 35, or it may be taken out manually if no spring is provided.

Figure 8:
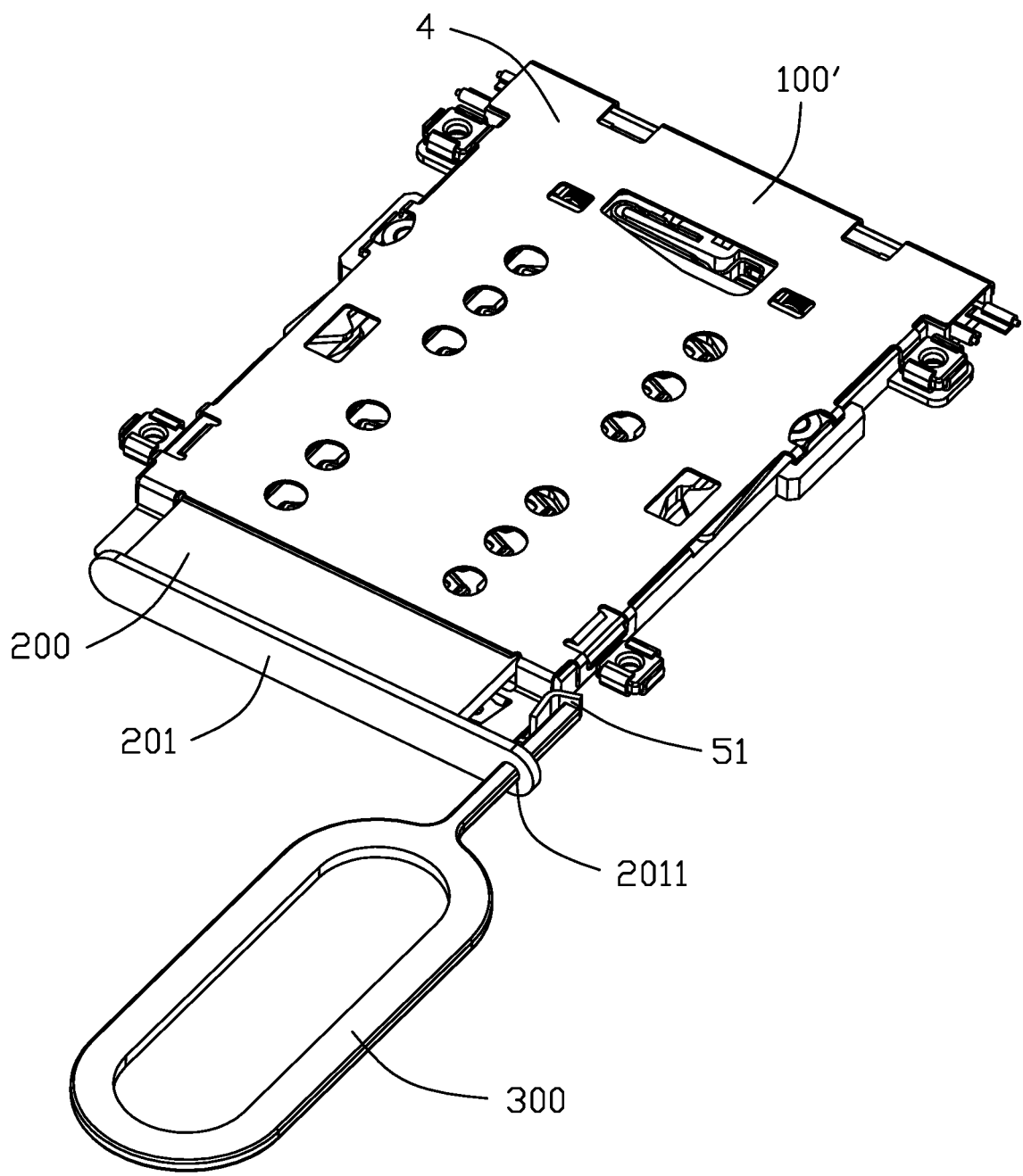
FIG. 8 is a perspective view of the card connector further showing the inserted card tray and a pin tool for operating an ejector.
Figure 9:
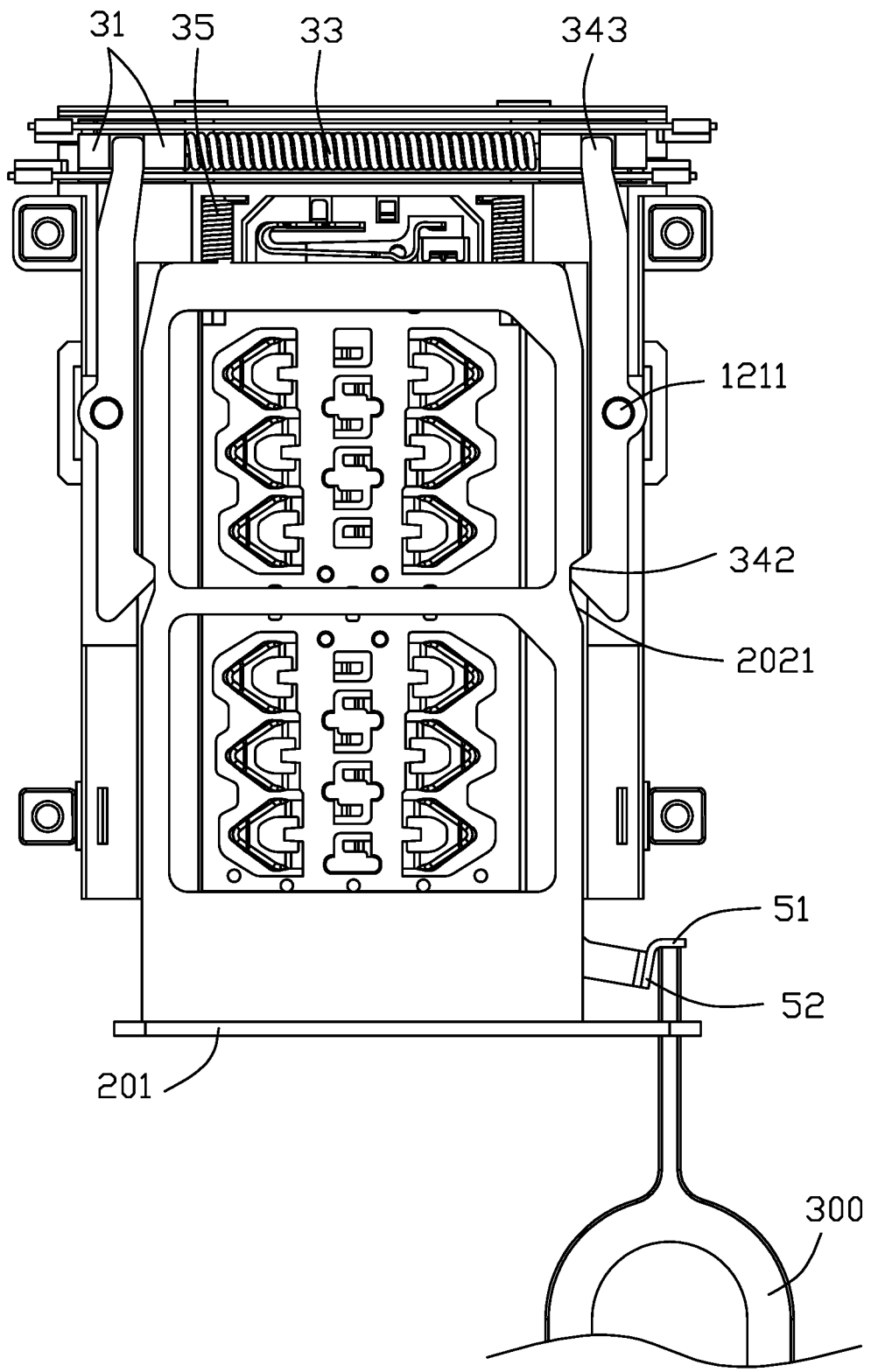
FIG. 9 is a top plan view, similar to FIG. 6, of the card connector in FIG. 8.
Figure 10:
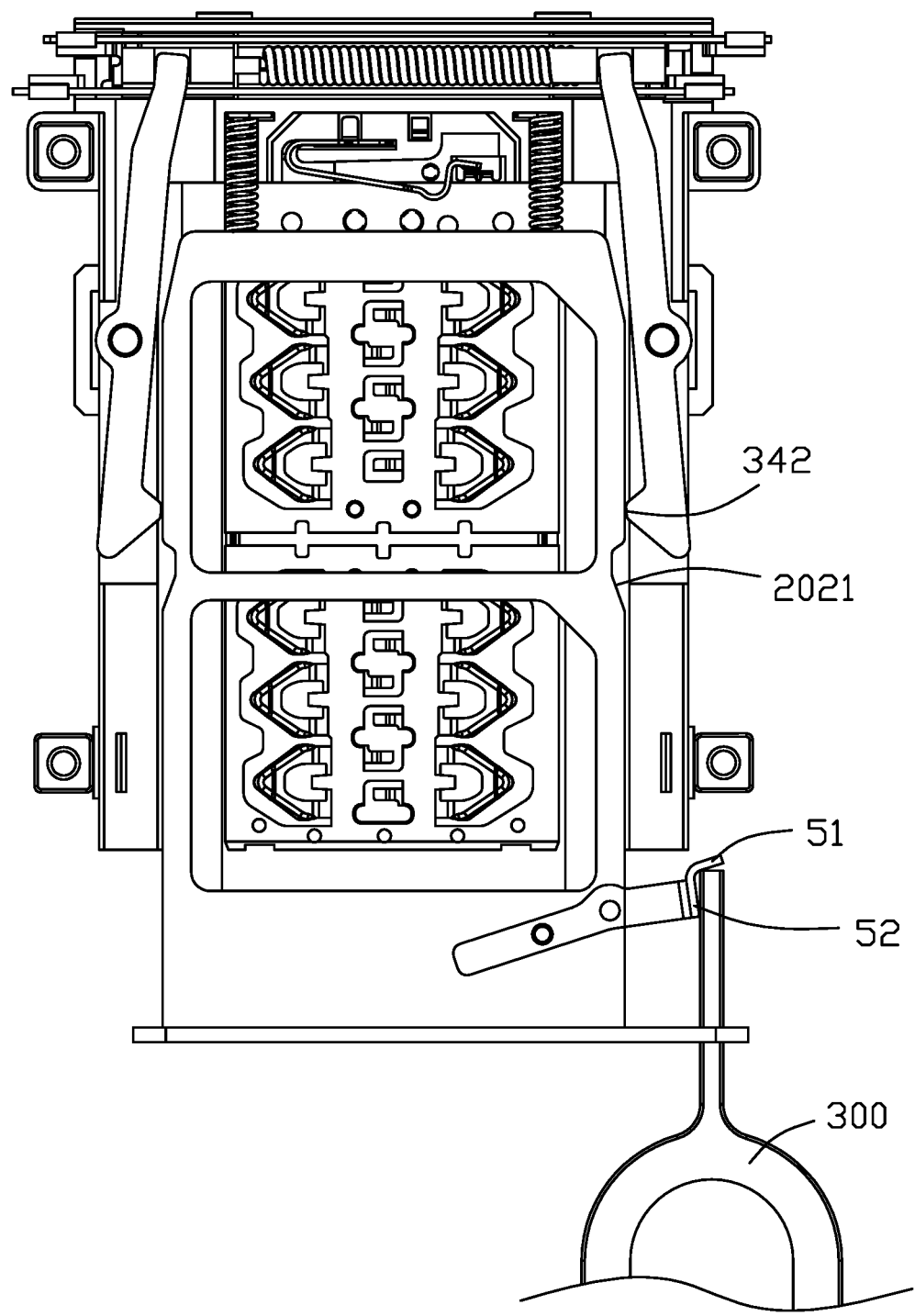
FIG. 10 is a view similar to FIG. 9 but showing the card tray being ejected.

Referring to FIGS. 8-10, as an alternative to contract the shape memory alloy wires 311, the pin tool 300 may be used to operate the ejector 5 manually in order to forcibly move the card tray 200 out of its locked position from the latches 34, as is done in existing card tray connector assemblies.

Figure 11:
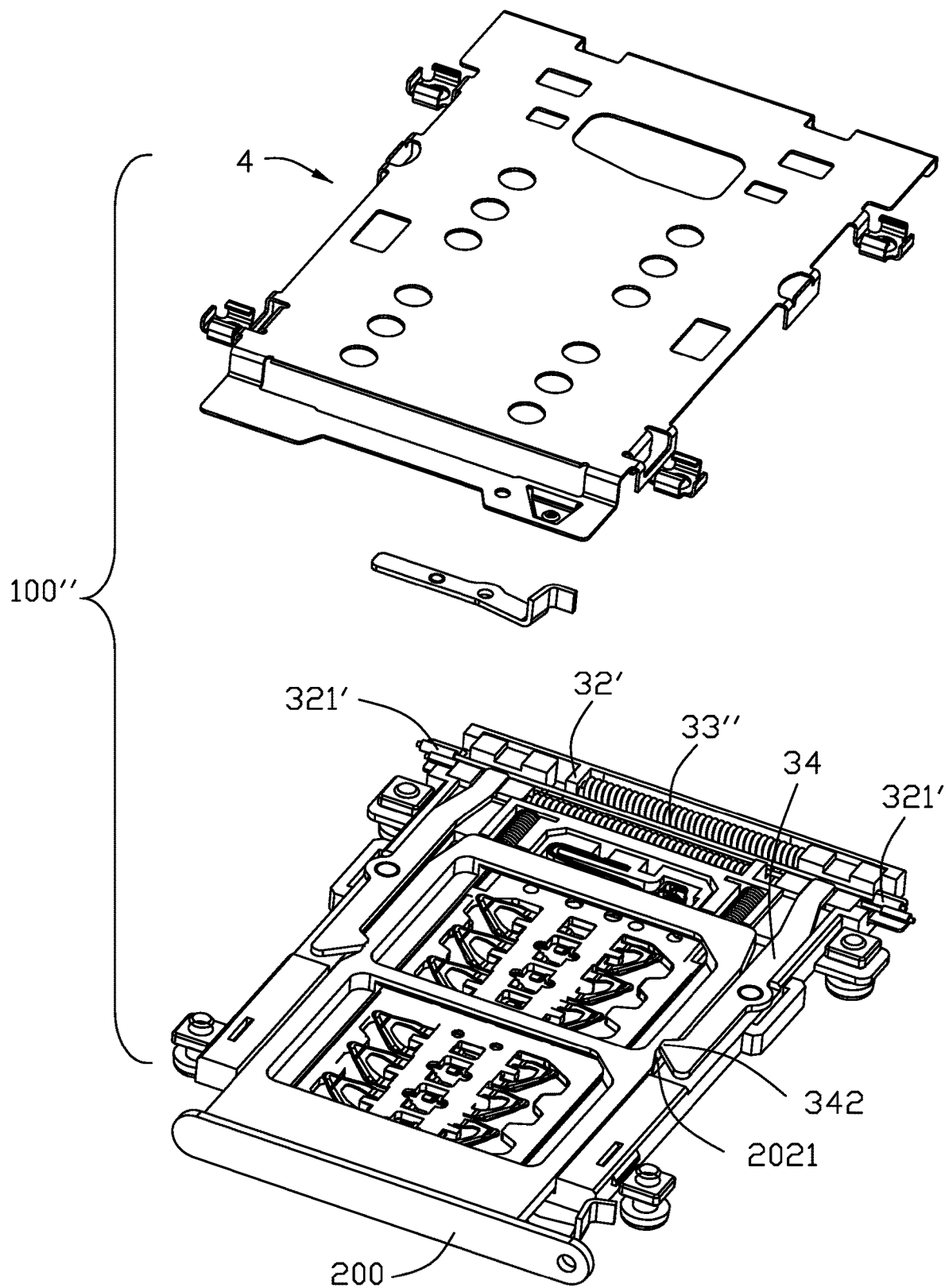
FIG. 11 is a perspective view of a card connector in accordance with a second embodiment of the present invention.
Figure 12:
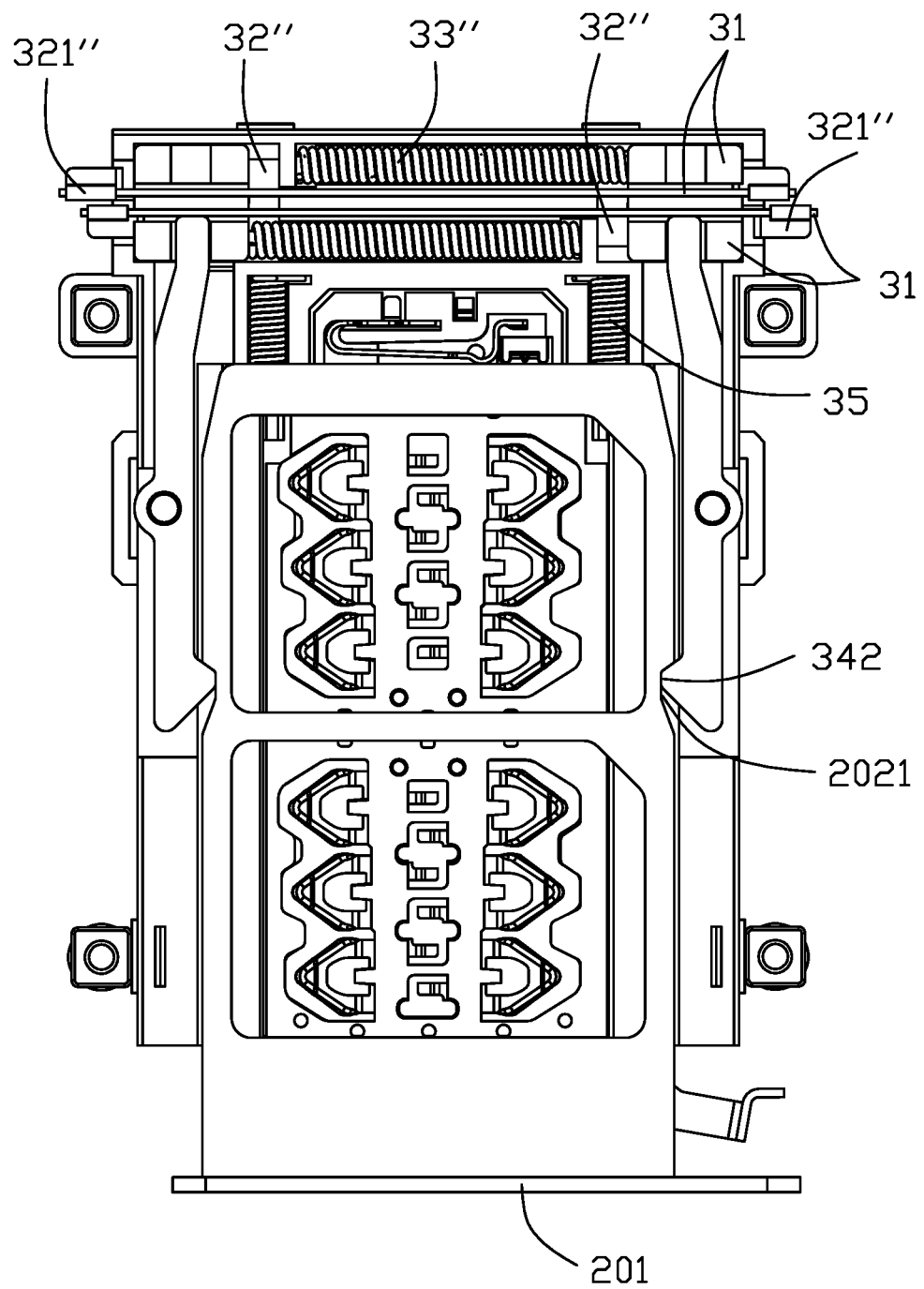
FIG. 12 is a top plan view, similar to FIG. 6, of the card connector in FIG. 11.
Figure 13:
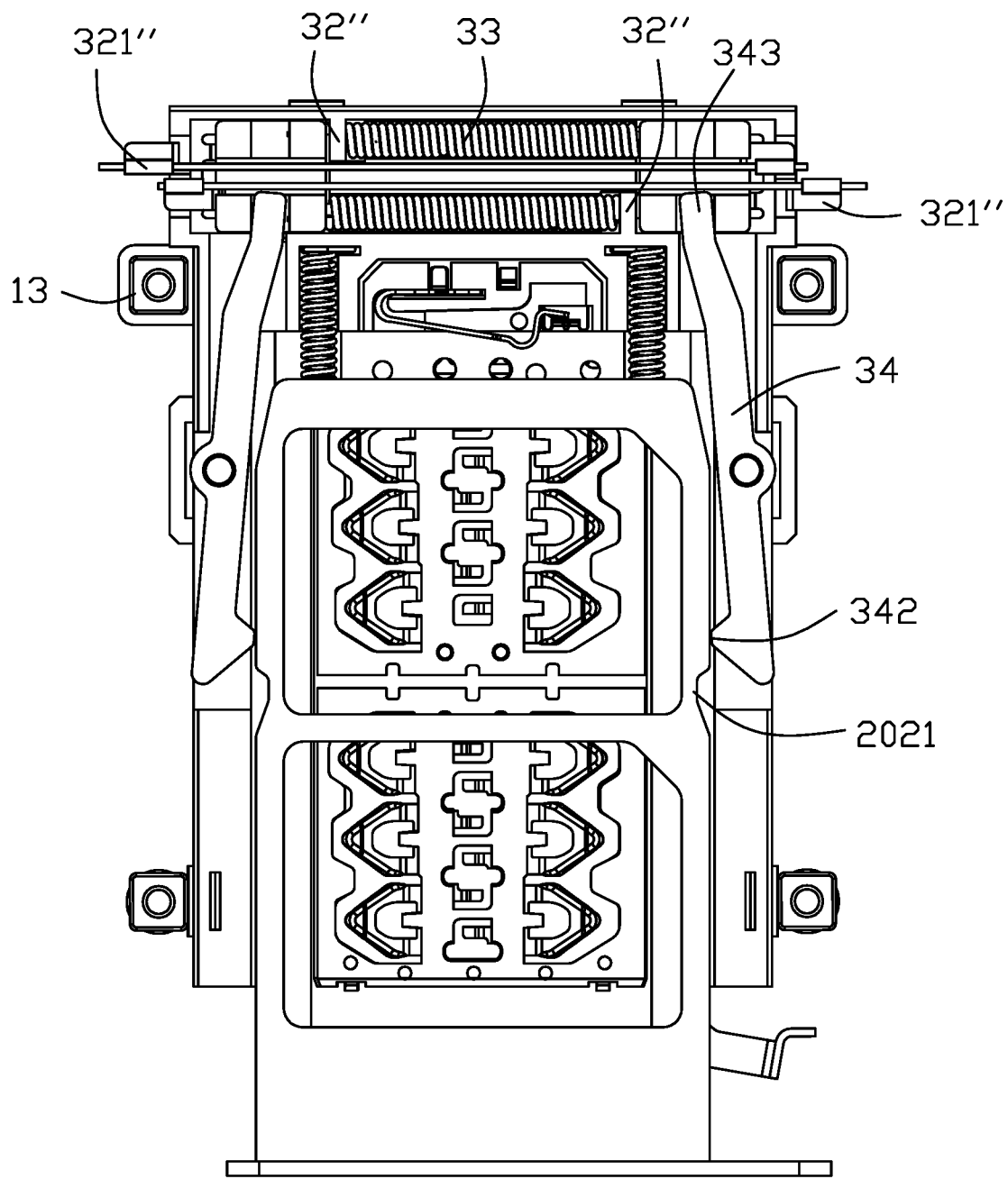
FIG. 13 is a view similar to FIG. 12 but showing the card tray being ejected.

Referring to FIGS. 11-13, an electrical connector 100" of a second embodiment differs from the first embodiment in that two springs 33" are provided and two stops 32" of the insulative body are provided for confining respective ends of the two springs as well as respective movement of the sliders. Specifically, each spring 33" is coupled between a corresponding stop 32" and a corresponding slider and a movement of this slider is restrained by the other stop. Operation of the second embodiment is otherwise same as the first embodiment.

Figure 14:
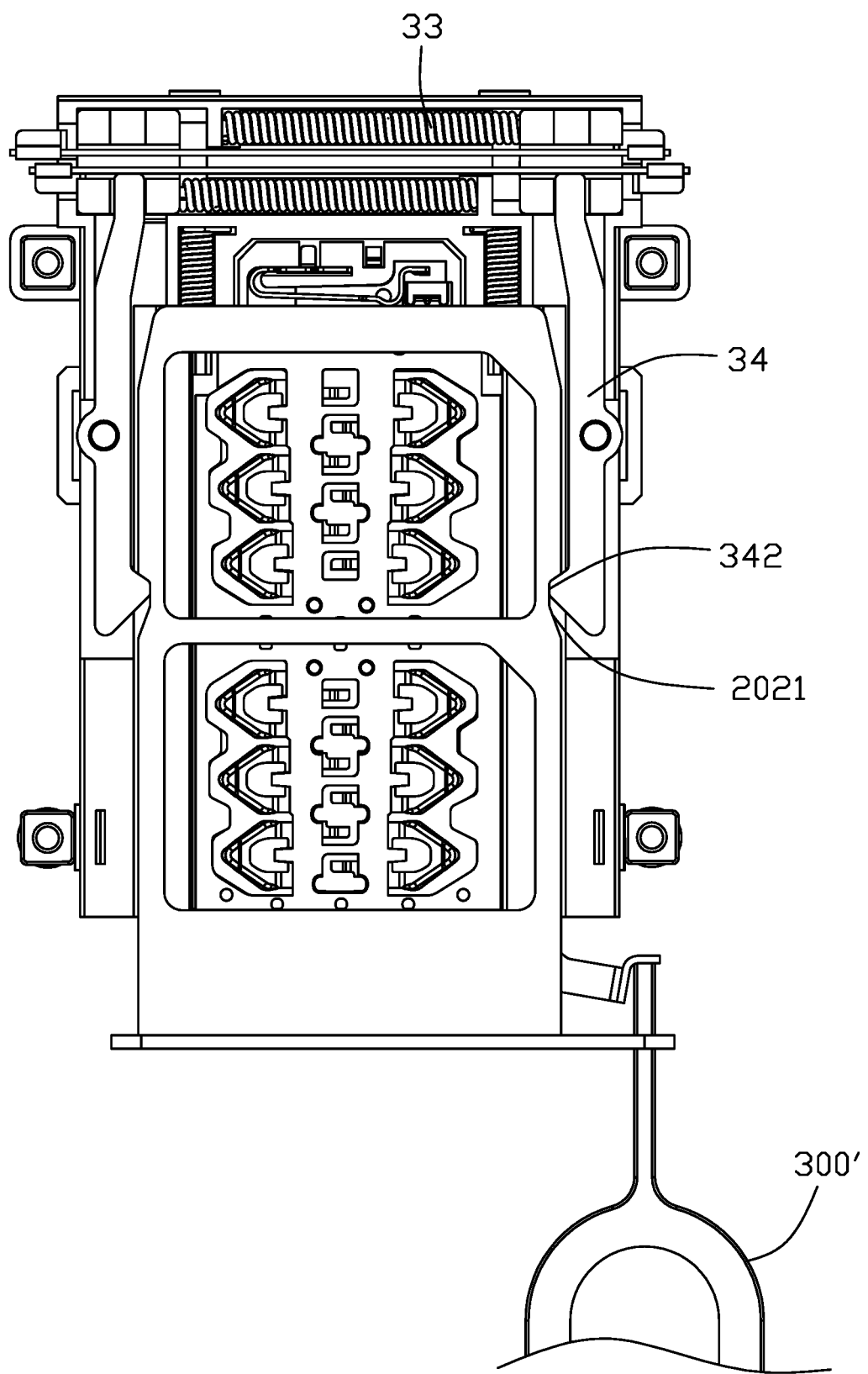
FIG. 14 is a top plan view, similar to FIG. 9, of the card connector in FIG. 11.
Figure 15:
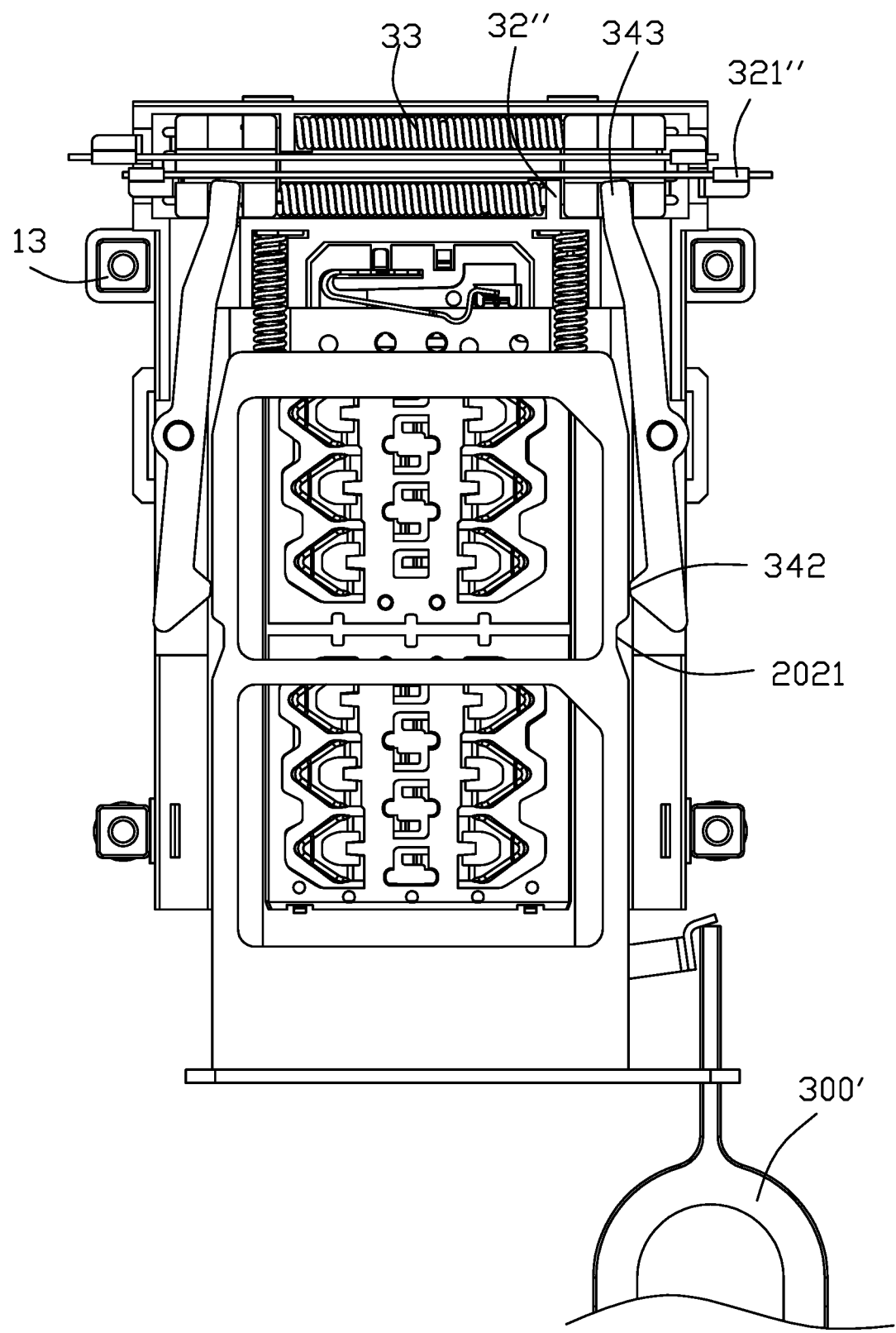
FIG. 15 is a view similar to FIG. 14 but showing the card tray being ejected.

Referring to FIGS. 14-15, again, a pin tool 300' may be used to operate an ejector instead so as to manually move a card tray out of its locked position from latches, in a way same as the first embodiment in FIGS. 8-10.

Figure 16:
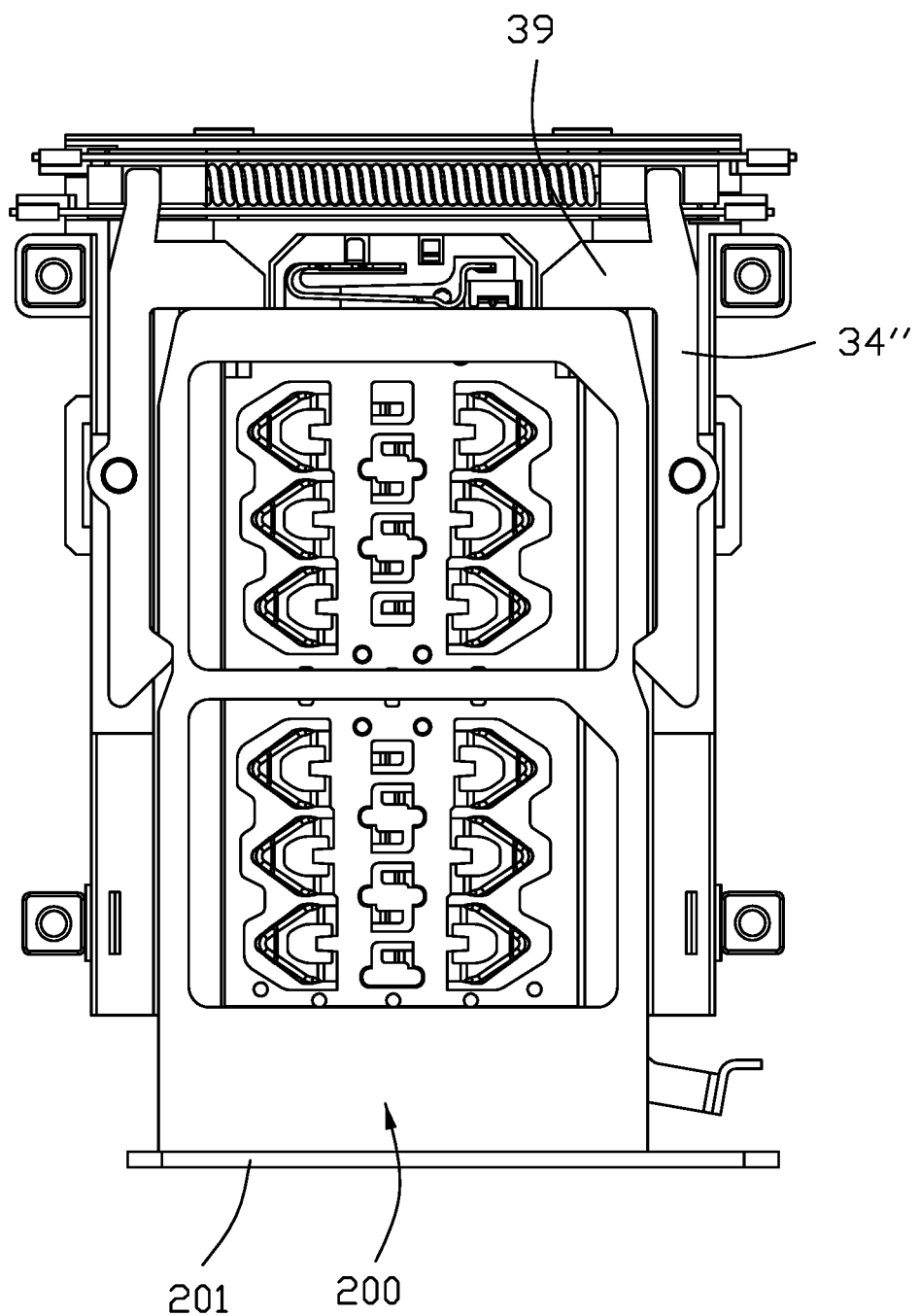
FIG. 16 is a top view of the card connector showing the card tray is locked by the latch according to a third embodiment.
Figure 17:
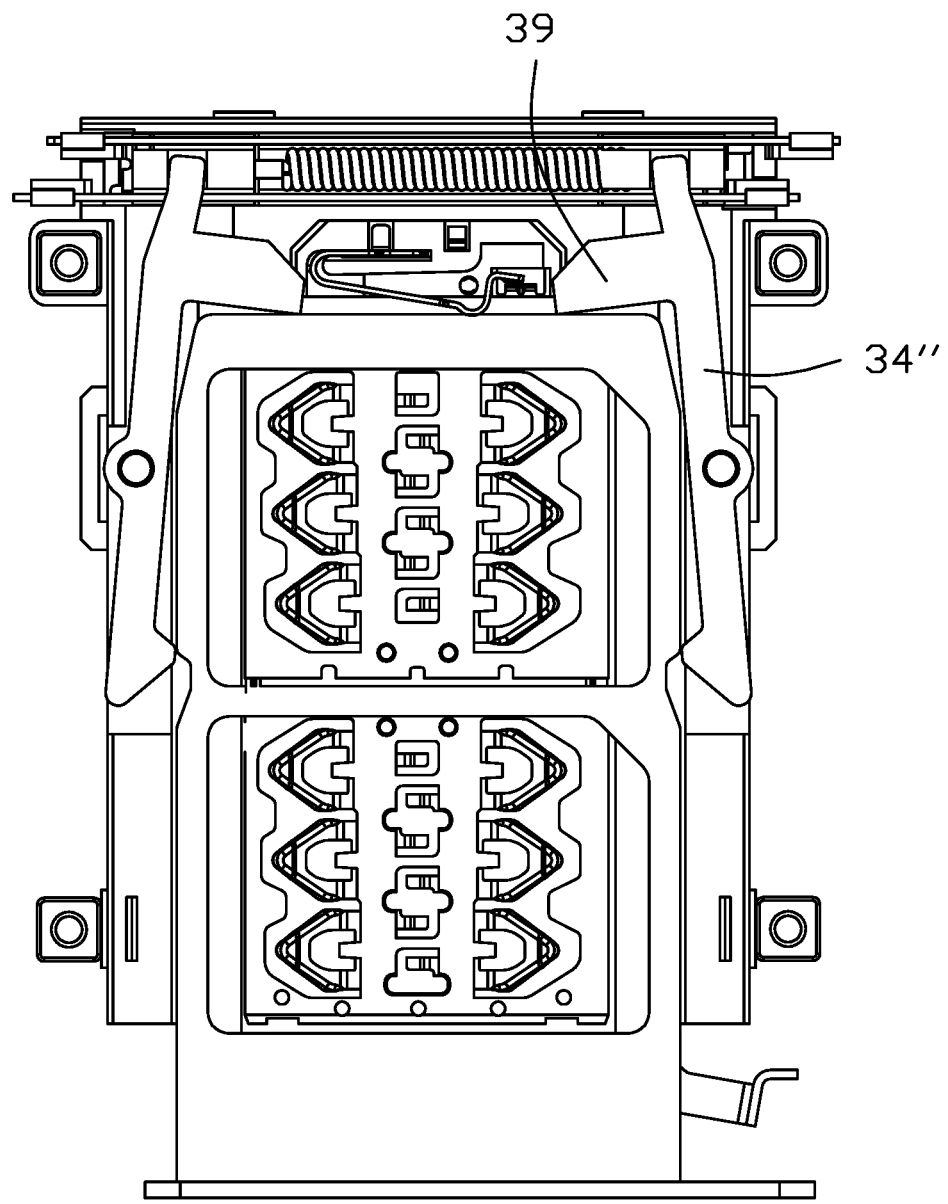
FIG. 17 is a top view of the card connector showing the card tray is unlocked by the latch and slightly ejected forwardly away from the insulative body.

Referring to FIGS. 16-17, in a third embodiment each latch 34''' unitarily includes an ejection tab 39 intimately abutting against a rear edge of the card tray so as to forwardly eject the card tray out of the insulative body when the latch 34''' is actuated by the shape memory alloy wire. In this embodiment, the spring 35 may be omitted.

What is claimed is:

1. A card connector comprising:
an insulative body;
a plurality of contacts secured to the insulative body; and
an operating mechanism including a latch moveable relative to the insulative body and an actuator coupled to the latch; wherein
the actuator includes a pair of terminals, a slider in constant contact with one of the pair of terminals, and a shape memory alloy wire coupled between the other terminal and the slider; and
the slider is operable by the shape memory alloy wire to move the latch from a card-locking position to a card-unlocking position.

2. The card connector as claimed in claim 1, wherein the slider includes an insulative part having a notch and a metallic piece secured to the insulative part, the metallic piece having a socket fixedly receiving a first end of the shape memory alloy wire.

3. The card connector as claimed in claim 1, wherein said other terminal has a socket fixedly receiving a second end of the shape memory alloy wire.

4. The card connector as claimed in claim 1, wherein the operating mechanism includes a first spring coupled between the insulative body and the slider.

5. The card connector as claimed in claim 1, wherein the operating mechanism includes a second spring having an end secured to the insulative body and an opposite end adapted for contacting a card tray.

6. The card connector as claimed in claim 1, wherein the insulative body includes a first part and a second part separated from the first part and insert molded with the plurality of contacts.

7. The card connector as claimed in claim 1, further comprising a cover and an ejector movably mounted to the cover.

8. The card connector as claimed in claim 1, wherein:
the operating mechanism includes another latch; and
the actuator includes another slider and another shape memory alloy wire, said another slider being coupled to said another latch and said other terminal, said another shape memory alloy wire being coupled between said one terminal and said another slider.

9. The card connector as claimed in claim 8, wherein the operating mechanism includes a spring coupled between the two sliders.

10. The card connector as claimed in claim 1, wherein the slider is constantly connected to the latch.

11. A card connector assembly comprising:
an insulative body;
a plurality of contacts secured to the insulative body;
a card tray received by the insulative body;
an operating mechanism including a latch locking the card tray in position and an actuator, the actuator including a pair of terminals, a slider in constant contact with one of the pair of terminals, and a shape memory alloy wire coupled between the other terminal and the slider, the slider being operable to move the latch to unlock the card tray.

12. The card connector assembly as claimed in claim 11, wherein the slider is constantly connected to the latch.

13. A card connector assembly comprising:
an insulative body;
a plurality of contacts retained in the insulative body;
a card tray moveably received within the insulative body in a front-to-back direction, a notch formed in a lateral side of the tray; and
a latch pivotally moveable with regard to the insulative body and including a first end with a hook adapted to be engaged within the notch, and a second end opposite to the first end; and
a slider constantly connected to the second end of the latch; wherein
the slider is actuated to move by a shape memory alloy wire operated in a circuit loop whereby when current passes the shape memory alloy wire, a dimension of the shaped memory alloy wire changes to move the second end of the latch, thus disengaging the hook from the notch.

14. The card connector assembly as claimed in claim 13, further including a spring constantly urging the latch to be in a locking position.

15. The card connector assembly as claimed in claim 14, wherein said spring is located at a rear end of the housing.

16. The card connector assembly as claimed in claim 13, further including a spring constantly forwardly urging the card tray out of the insulative body in the front-to-back direction.

17. The card connector assembly as claimed in claim 13, wherein said latch further unitarily includes an ejection tab located at an opposite side with regard to the first end to abut against a rear edge of the card tray so as to forwardly eject the card tray from the insulative body when the latch is moved by the shape memory alloy wire in a pivotal manner to unlock the card tray.

18. The card connector assembly as claimed in claim 13, further including a manually operable ejector to forwardly eject the card tray out of the insulative body.

19. The card connector assembly as claimed in claim 13, further including another latch to lock another lateral side of the card tray.

20. The card connector assembly as claimed in claim 19, further including a spring constantly urging both said two latches in locking positions.

* * * * *